Patented Mar. 1, 1938

2,109,457

UNITED STATES PATENT OFFICE 2,109,457

ARALKYL ETHERS OF SUBSTITUTED PHENOLS

Shailer L. Bass and Edward M. Van Duzee, Midland, Mich., assignors to The Dow Chemical Company, Midland, Mich., a corporation of Michigan No Drawing. Application July 31, 1936,
Serial No. 93,657

15 Claims. (Cl. 260—150)

The present invention concerns a new class of compounds, namely, the aralkyl ethers of cycloalkyl-substituted phenols.

We have prepared compounds of the aforementioned class, determined certain physical properties thereof whereby they may be readily identified, and found that they are particularly useful as intermediates for the manufacture of pharmaceuticals and as plasticizing agents for cellulose derivatives such as ethyl cellulose. The invention, then, consists in the new products hereinafter fully described and particularly pointed out in the claims.

The preparation of our new compounds can be accomplished by treating the alkali metal salt of a cycloalkyl-substituted phenol compound directly with an aralkyl halide.

For example, a cycloalkyl-substituted phenol compound is added to an alcoholic solution of metallic sodium, thereby producing an alcoholic phenolate solution. An aralkyl halide is then introduced slowly into said phenolate solution, maintained at its refluxing temperature, to form the desired ether product. The reaction mixture is then cooled and diluted with several volumes of water to precipitate therefrom a crude ether product, which may thereafter be separated in any convenient manner, such as by extraction with an organic solvent, decantation, etc. The crude product so obtained is washed with water and purified, as by distillation and fractional crystallization, to obtain the desired ether in substantially pure form.

Our new compounds may also be obtained by reacting a cycloalkyl-substituted phenol compound with an aralkyl halide in the presence of aqueous or aqueous-alcoholic solutions of sodium hydroxide or other suitable alkali; or as by-products in the preparation of aralkylated cycloalkyl-substituted phenols such as 2-benzyl-4-cyclohexyl phenol by the Claisen reaction, or, in certain cases, as a by-product in the condensation of aralkyl halides and cycloalkyl-substituted phenols with aluminum chloride.

The following examples describe in detail the preparation of certain specific members of our new class of compounds, but are offered only to illustrate the invention and are not to be construed as limiting the same.

Example 1

23 grams (1 mol.) of metallic sodium was digested with 500 milliliters of absolute alcohol, and 176.1 grams (1 mol.) of 2-cyclohexyl phenol reacted with the resulting alcoholate solution to form an alcoholic solution of sodium 2-cyclohexyl phenolate. This phenolate solution was warmed to its refluxing temperature and 126.5 grams (1 mol.) of benzyl chloride added thereto over a period of 1 hour. Refluxing was continued thereafter for 1 hour under atmospheric pressure, after which the reaction mixture was cooled and diluted with approximately 3 volumes of water. A dark oil separated out of the aqueous alcoholic suspension and was extracted therefrom with benzene, washed with water to remove suspended sodium chloride, filtered, and the benzene removed by distillation at atmospheric pressure. The dark, viscous residue obtained thereby was fractionally distilled under reduced pressure, whereby there was obtained 175.5 grams (0.66 mol.) of the benzyl ether of 2-cyclohexyl phenol as a water-white liquid boiling at 196° to 199° C. at 4 millimeters pressure and having the specific gravity 1.047 at 20°/4° C.

Example 2

23 grams of metallic sodium and 176.1 grams (1 mol.) of 4-cyclohexyl phenol were reacted in 500 milliliters of absolute alcohol to form the corresponding sodium 4-cyclohexyl phenolate. 126.5 grams (1 mol.) of benzyl chloride was reacted therewith as described in Example 1, the product being 134 grams (0.51 mol.) of the benzyl ether of 4-cyclohexyl phenol, which is a white, crystalline solid boiling at 199°–200° C. at 4 millimeters pressure and having a freezing point of 83.6° C.

Example 3

23 grams of metallic sodium, 210.6 grams (1 mol.) of a mixture of the monochloro 6-cyclohexyl phenols containing approximately 40 per cent by weight of the 2-chloro- and 60 per cent of the 4-chloro- isomers, and 126.5 grams (1 mol.) of benzyl chloride were reacted together as described in Example 1. Fractional distillation of the crude reaction mixture yielded as a major product 231 grams (0.77 mol.) of a mixture of the benzyl ethers of the isomeric monochloro 2-cyclohexyl phenols as a water-white liquid boiling between 193° and 210° C. at 4 millimeters pressure and having the specific gravity 1.125 at 20°/4° C.

Example 4

120.8 grams (0.75 mol.) of 4-chloro-benzyl chloride was reacted with 0.75 mol. of sodium 2-cyclohexyl phenolate in alcohol substantially as described. The major product from the reaction consisted in 140.2 grams (0.47 mol.) of the 4-chloro-benzyl ether of 2-cyclohexyl phenol, as a white, crystalline material boiling at 198°–202° C. at 2 millimeters pressure and having a freezing point of 53.2° C.

Example 5

17.3 grams of metallic sodium, 132.1 grams (0.75 mol.) of 2-cyclohexyl phenol and 138.9 grams (0.75 mol.) of beta-phenyl-ethyl bromide were reacted together as described in Example 1, the product being 74.8 grams of the beta-phenyl-ethyl ether of 2-cyclohexyl phenol, which is a water-white liquid boiling between 183° and 187° C. at 3 millimeters pressure and having the specific gravity 1.034 at 20°/4° C.

In a similar manner, other aralkyl ethers of cyclohexyl phenol compounds may be prepared containing halogen and alkyl and alkoxy radicals as substituents, e. g. 4-chloro-benzyl ether of 4-bromo-2-cyclohexyl phenol, benzyl ether of 2,4-dichloro-6-cyclohexyl phenol, 2-bromo-benzyl ether of 3-cyclohexyl phenol, 2,4-dichloro-benzyl ether of 2-methyl-4-cyclohexyl phenol, phenyl amyl ether of 2-cyclohexyl-4-tertiarybutyl phenol, 4-chloro-phenyloctyl ether of 2-methoxy-4-cyclohexyl phenol, phenyl-nonyl ether of 2-methyl-4-cyclohexyl-6-chlorophenol, etc. By substituting other cycloalkyl-substituted phenols, such as cyclopentyl phenol, for the cyclohexyl compound shown in the examples, corresponding aralkyl ethers may be prepared of the cyclopentyl phenols, etc. In place of the sodium salts employed in the above examples, other alcohol-soluble metallic cycloalkyl phenates may be employed, e. g. the potassium compounds, etc.

The compounds to which this invention particularly relates have the following formula:

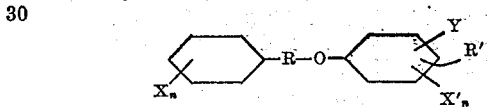

wherein X and X' represent the same or different halogens or hydrogen, n is an integer not greater than 2, R represents an alkylene radical, R' represents a cycloalkyl radical and Y represents hydrogen, an alkyl radical, or an alkoxy radical.

Other modes of applying the principle of our invention may be employed instead of those explained, change being made as regards the materials employed, provided the products described in the following claims be thereby obtained.

We therefore particularly point out and distinctly claim as our invention:

1. An aralkyl ether of a cycloalkyl-substituted phenol, having the formula:

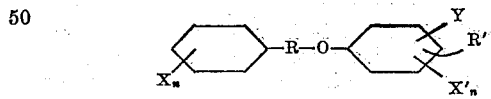

wherein X and X' represent members of the group consisting of the halogens and hydrogen, each n is an integer not greater than 2, R represents an alkylene radical, R' represents a cycloalkyl radical, and Y represents a substituent selected from the group consisting of alkyl, alkoxy, and hydrogen.

2. An aralkyl ether of a cycloalkyl-substituted phenol, having the formula:

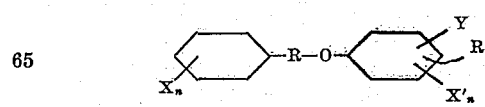

wherein X and X' represent members of the group consisting of the halogen and hydrogen, each n is an integer not greater than 2, R represents an alkylene radical containing from 1 to 8 carbon atoms inclusive, R' represents a cycloalkyl radical, and Y represents a substituent selected from the group consisting of alkyl, alkoxy, and hydrogen.

3. A halo-benzyl ether of a cycloalkyl-substituted phenol, having the formula:

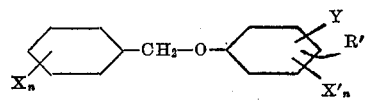

wherein X represents halogen, X' represents a member of the group consisting of the halogens and hydrogen, each n is an integer not greater than 2, R' represents a cycloalkyl radical, and Y represents a substituent selected from the group consisting of alkyl, alkoxy, and hydrogen.

4. A chloro-benzyl ether of a cycloalkyl-substituted phenol having the formula:

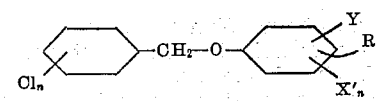

wherein X' represents a member of the group consisting of the halogens and hydrogen, each n is an integer not greater than 2, R' represents a cycloalkyl radical, and Y represents a substituent selected from the group consisting of alkyl, alkoxy, and hydrogen.

5. An aralkyl ether of a cycloalkyl-substituted chloro-phenol having the formula:

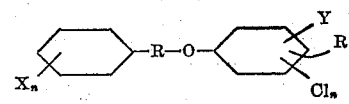

wherein X represents a member of the group consisting of the halogens and hydrogen, each n is an integer not greater than 2, R represents an alkylene radical, R' represents a cycloalkyl radical, and Y represents a substituent selected from the group consisting of alkyl, alkoxy, and hydrogen.

6. An aralkyl ether of a cyclohexyl phenol compound having the formula:

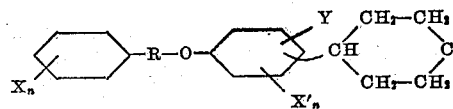

wherein X and X' represent members of the group consisting of the halogens and hydrogen, each n is an integer not greater than 2, R is an alkylene radical, and Y represents a substituent selected from the group consisting of alkyl, alkoxy, and hydrogen.

7. An aralkyl ether of a cyclohexyl phenol compound having the formula:

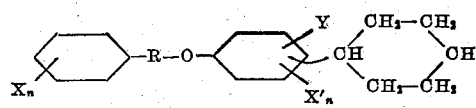

wherein X and X' represent members of the group consisting of the halogens and hydrogen, each n is an integer not greater than 2, R is an alkylene radical containing from 1 to 8 carbon atoms inclusive, and Y represents a substituent selected from the group consisting of alkyl, alkoxy, and hydrogen.

8. A halo-benzyl ether of a cyclohexyl phenol compound having the formula:

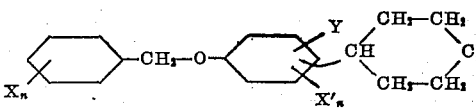

wherein X and X' represent members of the group consisting of the halogens and hydrogen, each n is an integer not greater than 2, and Y represents a substituent selected from the group consisting of alkyl, alkoxy, and hydrogen.

9. A chloro-benzyl ether of a cyclohexyl phenol compound having the formula:

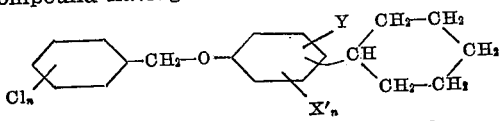

wherein X' represents a member of the group consisting of the halogens and hydrogen, each $n$ is an integer not greater than 2, and Y represents a substituent selected from the group consisting of alkyl, alkoxy, and hydrogen.

10. A benzyl ether of a cyclohexyl phenol compound having the formula:

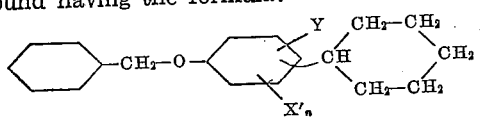

wherein X' represents a member of the group consisting of the halogens and hydrogen, $n$ is an integer not greater than 2, and Y represents a substituent selected from the group consisting of alkyl, alkoxy, and hydrogen.

11. A benzyl ether of a cyclohexyl chlorophenol having the formula:

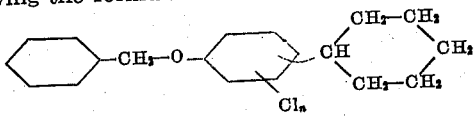

wherein $n$ is an integer not greater than 2.

12. A benzyl ether of cyclohexyl phenol having the formula:

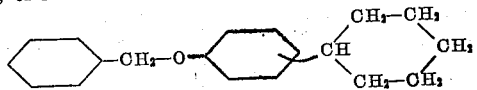

13. Benzyl ether of 2-cyclohexyl phenol.
14. Benzyl ether of 4-cyclohexyl phenol.
15. Benzyl ether of 2-cyclohexyl monochlorophenol.

SHAILER L. BASS.
EDWARD M. VAN DUZEE.